United States Patent [19]
Pollock

[11] Patent Number: 6,067,835
[45] Date of Patent: May 30, 2000

[54] WIRE STRAIGHTENER

[76] Inventor: Michael R. Pollock, 8044 Hummel, Boise, Id. 83709

[21] Appl. No.: 09/285,321

[22] Filed: Apr. 2, 1999

[51] Int. Cl.[7] .................. B21D 3/05; B21F 1/02
[52] U.S. Cl. ................. 72/160; 72/183; 140/147
[58] Field of Search .............. 140/147; 72/160, 72/162, 164, 183

[56] References Cited

U.S. PATENT DOCUMENTS

| | | | |
|---|---|---|---|
| 3,343,574 | 9/1967 | Mersek | 140/147 |
| 3,395,559 | 8/1968 | Ungerer | 72/17 |
| 3,457,752 | 7/1969 | Hagemann | 72/129 |
| 3,595,277 | 7/1971 | Lefever | 140/147 |
| 3,879,978 | 4/1975 | Harris, Jr. | 72/183 |
| 4,355,526 | 10/1982 | Miles | 140/147 |
| 4,464,919 | 8/1984 | Labbe | 72/162 |
| 5,161,584 | 11/1992 | Krainaker et al. | 140/147 |
| 5,676,010 | 10/1997 | College et al. | 72/162 |

Primary Examiner—Lowell A. Larson
Attorney, Agent, or Firm—Frank J. Dykas

[57] ABSTRACT

A wire straightener is provided which uses three roller sets in one plane to apply deflection forces to a wire, which may have bends or coiling memory in more than one plane, so that the wire exits the wire straightener essentially straight, and free of bends or the tendency to coil and kink. The wire straightener adjusts for changes in pull angle as a means of accommodating different sizes of wires, by freely rotating around a pivot point, so that the amount of wrap of a wire around the last roller automatically adjusts. The wire straightener can straighten more then one wire at a time, and has multiple wire guides for feeding the wire onto the rollers. It is designed so that the wire may be threaded onto the wire straightener in the middle of a length of the wire, without having to feed the wire on using the end of the wire. The wire straightener is adapted for use with wire which has been wound onto a cylindrical spool for storage and dispensing. The wire straightener can be mounted to a frame, or to any pivot point, such as a bolt or a nail driven into a solid object.

12 Claims, 6 Drawing Sheets

WIRE STRAIGHTENER

BACKGROUND OF THE INVENTION

1. Field of the Invention

The present invention generally relates to devices for straightening wire, and more particularly to devices for removing coiling memory from wire which has been coiled on a spool.

2. Background Information

A number of wire straighteners are known in the prior art. These typically involve a bank of rollers which the wire passes through and which are oriented in one plane, followed by a second bank of rollers which act against the wire, and which are oriented in a second plane, perpendicular to the first. The typical wire straightener of the prior art has a wire guide, and specifically acts on one wire at a time. Wire straighteners of the prior art typically have a mechanism for adjusting for different wire diameters. That adjustment is by changing the spacing of the rollers for different diameters of wire. The wire straighteners of the prior art often have indicia inscribed on the wire straightener, or markings of some type to assist in adjusting the roller spacing for different wire sizes. The wire straighteners of the prior art are typically large machines which are part of an industrial process, and are not made to be easily portable or transportable to a work site. They are also not designed to insert the middle of a length of wire, but instead require the insertion of an end of the wire to be straightened.

One situation in which the prior art wire straighteners are not useful for solving a wire straightening problem is at construction sites, either industrial or commercial. Electrical wire is brought to the site wound onto spools. Depending upon the specific application, the wire can be a number of gauges, of which 8 gauge, 10 gauge, 12 gauge, and 14 gauge are typical. When such wire is taken off the spool, if it is cut and laid on the floor of the work area, the wire immediately partially coils itself up. When the wire is fed into a conduit from such a position, some of the coils of the wire may form loops and kinks which must be straightened out before being fed into a conduit.

One specific situation which is very common on a construction work site is when wire needs to be fed into the middle of a conduit run to provide a continuous, unbroken wire from one point to another. A typical situation when this might occur is when three junction boxes are connected by two sections of conduit, each of them 150 feet long. Especially in industrial situations of this sort, it is required that the entire 300 foot length of conduit be supplied by one or more unbroken wire 300 feet long. To do this, a spool of wire containing at least 300 feet is brought to the middle junction box. The free end of wire on the spool is fed into one of the 150 foot conduit runs. If the wire is fed directly into the conduit and not laid on the floor, the conduit itself contains the wire, and prevents it from reverting to the coiled configuration which is dictated by its coiling memory. Once 150 feet of wire is fed into the conduit so that it exits the conduit at one of the end junction boxes, then another 150 feet of the same wire must be fed into the other length of conduit. To do this, 150 feet of more wire is pulled off of the spool of wire, and the wire is cut. This wire cannot be fed directly into the conduit off the spool, since it first must be cut at a point 150 feet from the middle conduit. When this 150 foot length of wire is removed from the spool, since it cannot be immediately fed into a conduit, it tends to coil and form kinks. What is needed for a situation such as this is a wire straightener which is small and portable, so that it can be used on a construction site to straighten wire which comes on spools.

Accordingly, it is an object of the invention to provide a wire straightener which is light weight and portable enough that it can be used on a construction job site. Another object of the invention is to provide a wire straightener in which wire can be placed in the wire straightener, or removed from the wire straightener, at the middle of a long length of wire, and not necessarily at either of its ends. Another object of the invention is to provide a wire straightener which does not require moving the position of rollers to adjust for different wire sizes, but which can accommodate different wire sizes and multiple wires being straightened at the same time. A further object of the invention is to provide a wire straightener which adjusts for different sizes of wires by changing the amount of wrap of the wire around one or more of the rollers, rather than changing the position of the rollers. A further object of the invention is to provide a wire straightener which straightens wire from spools by rollers oriented in only one plane.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

These and other objects and advantages are attained by the wire straightener of the invention. The wire straightener of the invention is designed for removing coiling memory from a wire, such as wire which has been wound on a cylindrical spool. The wire straightener includes a planar and generally L-shaped roller plate which provides a mounting base for a wire straightening means, and which also provides one or more pivot points around which the planar L-shaped roller plate may rotate. A number of rollers are attached to the planar L-shaped roller plate. These rollers can be arranged in stacked groups of rollers, such as three rollers mounted in a column, or can be attached as single rollers. The rollers act as the wire straightening means. A wire is passed through and around the rollers as the wire passes through the wire straightener. Each roller deflects the wire in a direction 180° opposite from the deflection of the adjacent roller. The rollers are configured in one plane, and act to deflect the wire in that plane only. A wire which contains bends in more than one plane is straightened by passing through the rollers, even though the rollers are in only one plane. The grooves of the rollers exert a force on the wire to center the wire in the rollers in one plane. This may help to straighten wire bent in more than one plane. As the wire is pulled through the wire straightener, the roller plate is placed on a pivot point and allowed to rotate freely around this pivot point. An anchoring means is used to allow the wire straightener to rotate around the pivot point. In this manner, the wire straightener aligns itself to the direction of pull, and self adjusts for wires of different sizes by changing the amount of wrap the wire around the end of the three rollers. This is different than most other wire straighteners, which change the position of rollers relative to other rollers to accommodate for different sizes of wires. In this device, the location of the rollers is fixed, and the angle of the rollers, especially the end roller, to the direction of pull on the wire is variable, which allows for different sizes of wires.

An important feature of the wire straightener is that wire can be placed in the wire straightener in the middle of a length of wire, and without the need to insert an end of the wire. The rollers of the device can take various configurations, such as wheels with grooved rims, like the sheaf of a pulley. With such a roller, the groove in the rim has sides and a bottom. The groove in the rim can be semicircular in shape, with rounded sides and bottom.

The wire straightener can be provided with a number of pivot points, with each pivot point placed to provide correct alignment of the wire and the rollers and the correct amount of wire wrap around the rollers for a particular size of wire. The planar L-shaped roller plate of the wire straightener can be mounted on a frame which includes wire spool axles for mounting wire spools. The wire straightener can also be anchored using other devices, such as a nail driven into a bench, a nail driven into a floor, a bolt adjacent to a wire spool rack, or any other solid mounting. If mounted to a frame, the frame can have wheels and be transportable, and can provide a mounting and dispensing rack for wire on spools.

The wire straightener of the invention can have one or more wire guides which guide the wire onto the rollers of the device, and can also have multiple rollers on each roller axle, so that more than one wire may be straightened at the same time.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Figure 1:
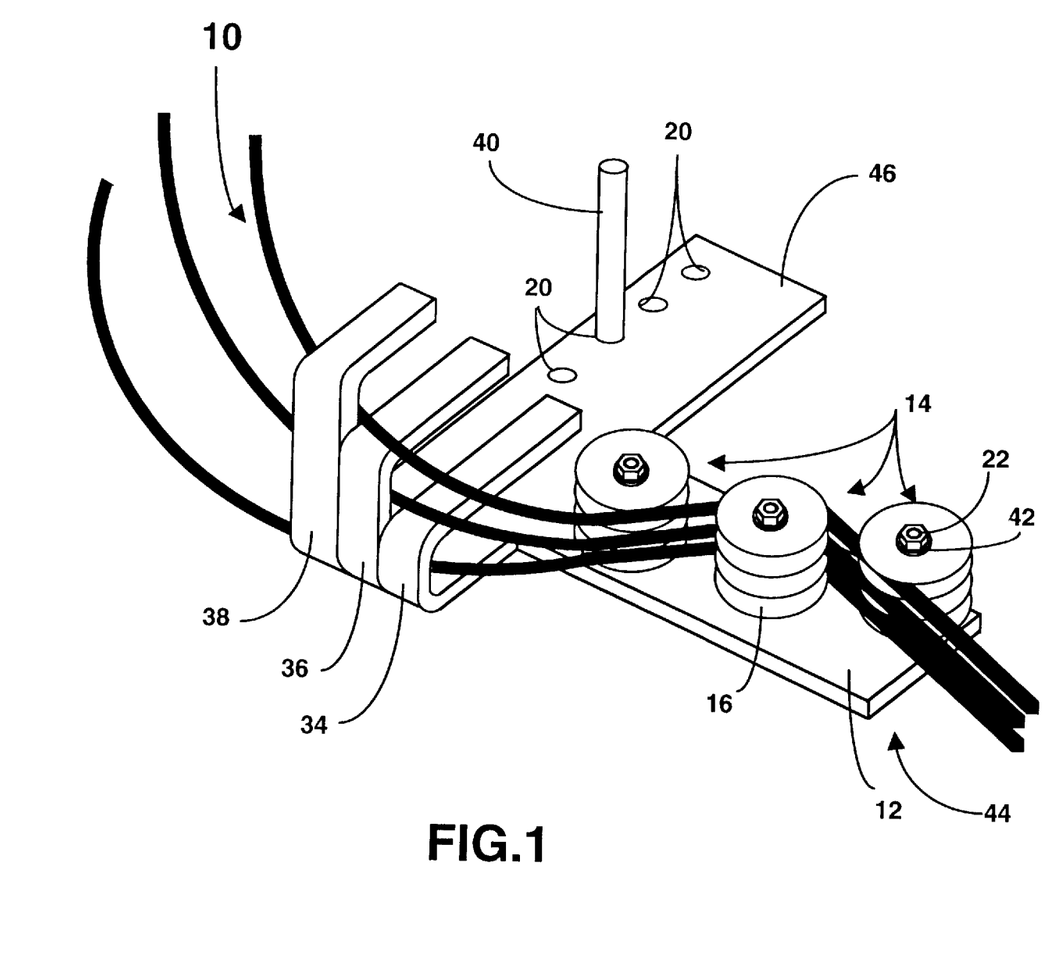
FIG. 1 is a perspective view of the wire straightening device showing three wires running through the device.

Some of the preferred embodiments of the invention are shown in the figures. FIG. 1 is a perspective view of the wire straightener of the invention. The wire straightener 10 includes a planar L-shaped roller plate 12 on which are mounted three roller sets 14. Roller plate 12 is typically made of flat steel, or other suitable metal. Each roller is approximately 31 mm in diameter and 8 mm thick. Each roller set 14 is comprised of three individual rollers 16. The rollers 16 are mounted on a roller axle 22, which is secured to the roller plate 12 by a nut 42. The roller plate 12 has a roller end 44 and a pivot end 46. Along the pivot end 46 are located a number of pivot holes 20. In the region of roller plate 12 where roller end 44 and pivot end 46 are joined, are located a first wire guide 34, a second wire guide 36, and a third wire guide 38. Roller plate 12 can be made of one contiguous piece of metal, or the roller end 44 can be a separate piece which is welded to the pivot end 46. The wire guides 34, 36 and 38 are preferably contiguous with the roller plate 12, and merely bent into shape from a T-shaped piece of metal, as shown in FIG. 1. Obviously, other configurations of wire guides 34, 36, and 38 would serve equally well.

Figure 2:
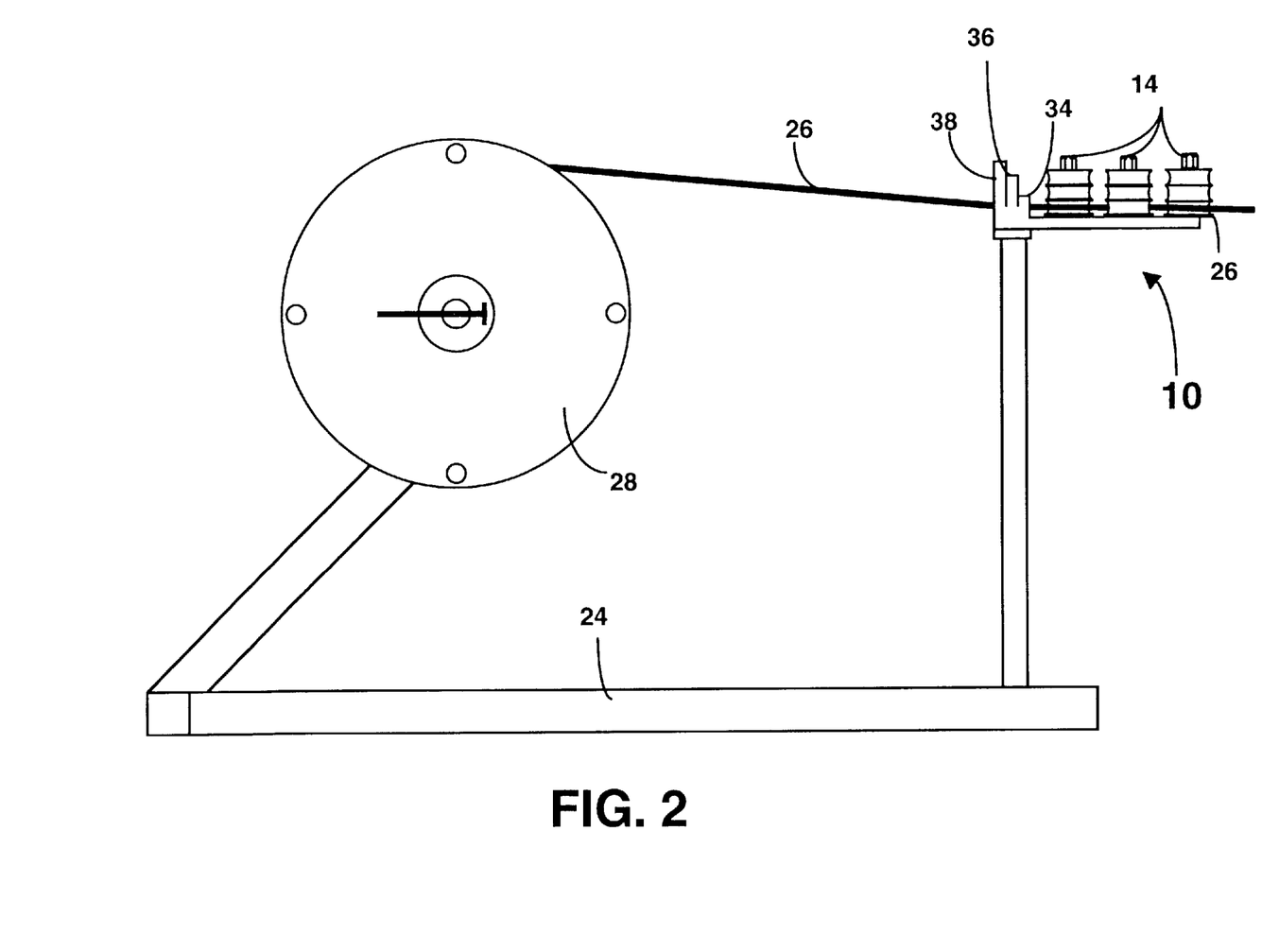
FIG. 2 is a side view of the wire straightener mounted on a frame with a spool of wire.
Figure 5:
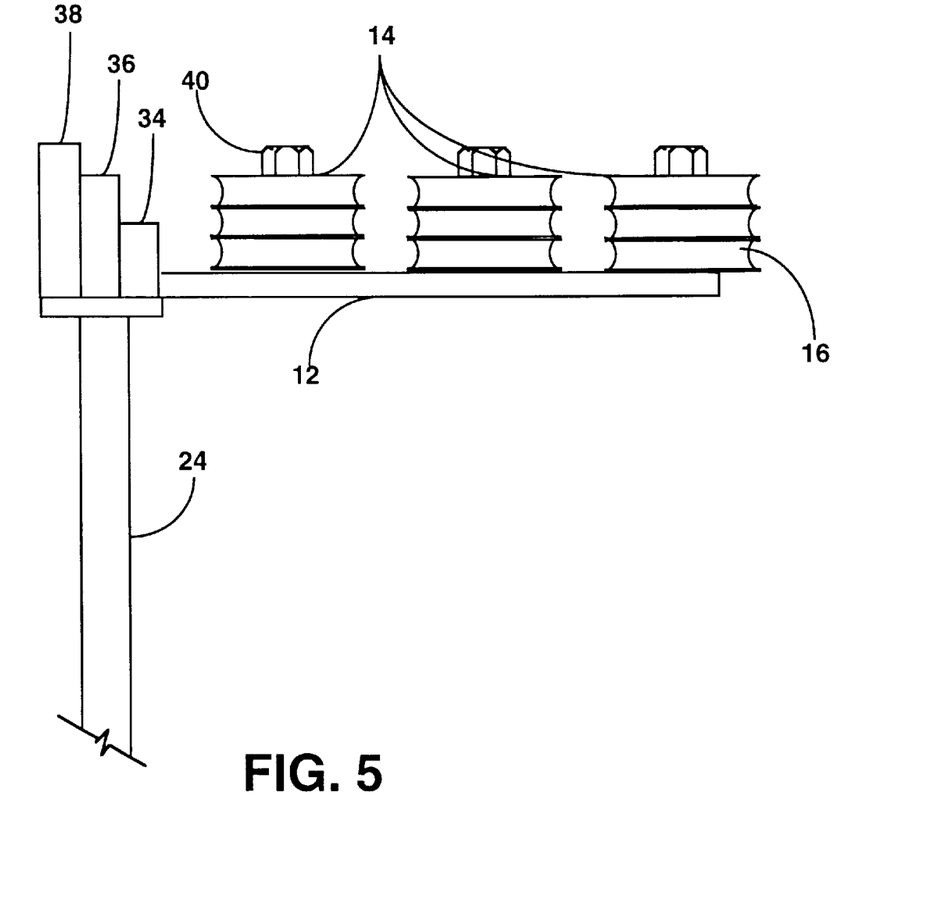
FIG. 5 is a side view of the wire straightener.

The wire straightener 10, as shown in FIG. 1, is made to be fixed in place by placing one of the pivot holes 20 over a pivot bolt 40. Pivot bolt 40 can be attached to a frame which also supports spools 28 of wire 26. The wire straightener 10 of FIG. 1 can also be attached to other pivot bolts 40. For instance, a nail driven into a solid mounting can serve as a pivot bolt 40. If used in this manner, the wire straightener can be attached to any sort of projection, such as a bolt or a nail. It may be convenient, however, to attach the wire straightener 10 to a frame or rack which has storage positions for a number of wire spools 28. Some spool frames in common use also include means for transporting spool frames, such as wheels and handles. The wire straightener 10 is shown mounted to a simple frame 24 in FIGS. 2 and 5.

The wire straightener 10 operates on the principle that wire 26 from a spool 28 can be straightened by applying reversing bending forces by rollers which are oriented in only one plane. This is true even if the wire has bends which are in more than one plane. Wire wrapped on a spool will tend to have coiling memory in only one plane, but other configuration of wire with bends in more than one plane will also be straightened in the device.

Figure 3:
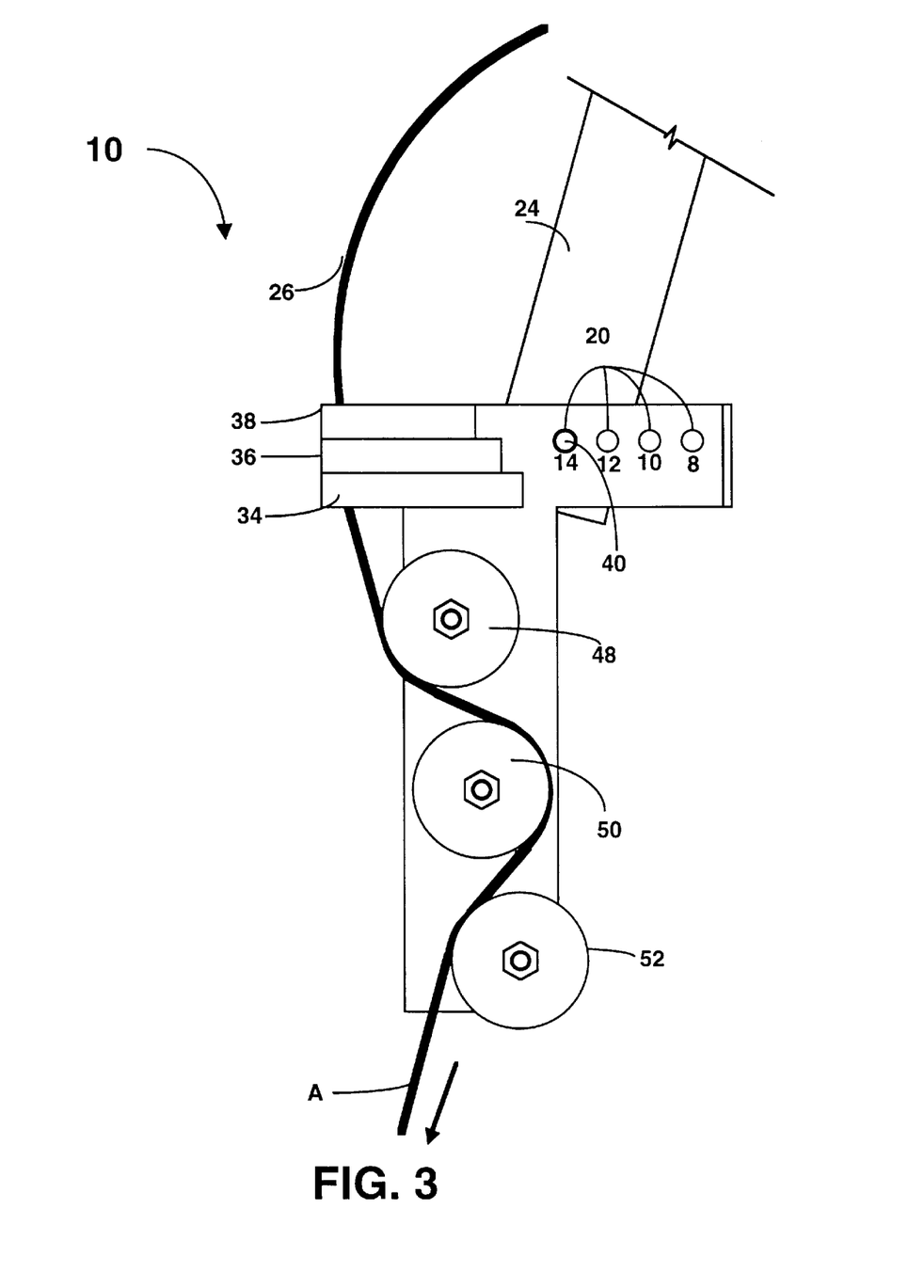
FIG. 3 is a top view of the device with the wire straightener configured for a 14-gauge wire, and with the 14-gauge wire extending through the device.
Figure 4:
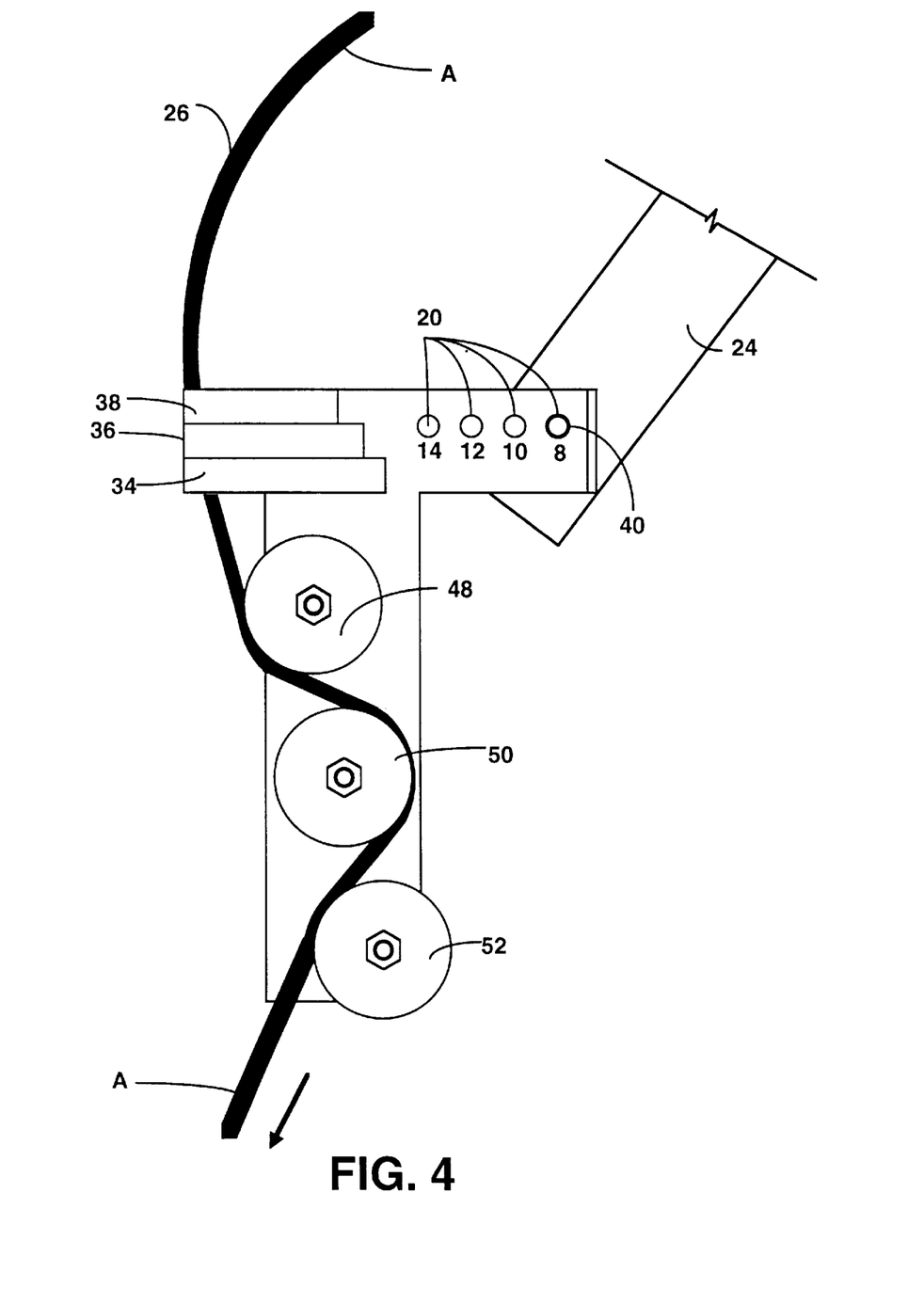
FIG. 4 is a top view of the wire straightener, showing it configured for straightening 8-gauge wire, and with the 8-gauge wire extending through the device.

Another important feature of the device is that wire 26 does not have to be fed through from an end. The middle of a long section of wire 26 can be threaded through the wire straightener 10, as can be seen in FIGS. 3 and 4. The section of wire 26 in the middle of a long length of wire 26 would be slid under any of the wire guides 34, 36 or 38. The wire 26 would then be wound counterclockwise around a first roller position 48, then clockwise around a second roller position 50, and counterclockwise around a third roller position 52.

When thus mounted, when a pulling force is applied to the wire 26 at region A, in the direction of the arrow at A, wire 26 is pulled through the three rollers 48, 50 and 52, and is rolled off of spool 28. As it exits the three rollers, 48, 50 and 52, it is essentially straight, and free of the coiling memory which could cause wire 26 to coil up and form loops when laid on the floor.

The wire straightener 10 also operates on the principle that a wire straightener can accommodate different sizes of wires 26 to be straightened, by changing the amount of wrap of the wire 26 around the roller 52. The amount of wrap of the wire 26 around the roller 52 is adjusted first selecting a pivot hole 20, and placing the selected pivot hole 20 over a bolt, nail, or other pivot bolt 40. Thus mounted, the wire straightener 10 is free to rotate around a pivot hole 20. The wire straightener 10 is provided with a number of pivot holes 20, corresponding with different wire sizes. The wire straightener adjusts for different size wire by self adjusting for variations in the pulling force direction which keeps the angle between the line between rollers 50 and 52, and the pulling force direction constant. To adjust for different wire sizes, a user must manually change the pivot point. FIGS. 3 and 4 show pivot holes 20 configured for wire sizes 14, 12, 10 and 8 gauge. In FIG. 3, the pivot hole 20 is appropriate for 14 gauge wire if placed over a pivot bolt 40. A pulling force is applied to the wire 26 at point A in the direction shown by the arrow, and parallel to the axis of the frame 24. A section of wire 26 which extends from the spool 28 to the first roller 48 is under very little tension, assuming that the spool 28 is free to rotate and feed off wire 26. In the configuration shown in FIG. 3, a 14-gauge wire 26 extends around the rollers 16 as shown and is subject to deflection at each roller 16.

FIG. 4 shows the wire straightener 10 configured to straighten 8-gauge wire, with the pivot hole 20 for 8-gauge wire engaged over a pivot bolt 40 attached to a frame 24. The direction of pull is again parallel with the frame 24, and the wire 26 is pulled at point A in the direction of the arrow. The wire 26 between the spool 28 and the first roller 48 is once again under little pressure, assuming that the spool 28 is free to rotate. As in FIG. 3, the 8-gauge wire of FIG. 4 is deflected by each of the rollers 16, but it is deflected to a lesser degree by third roller 52. The combined deflection of the rollers 48, 50 and 52 is appropriate to cancel the coiling memory of 8-gauge wire 26, so that it exits the wire straightener 10 essentially straight, and if laid on the floor would not tend to coil up or form loops.

The wire guides 34, 36, and 38 keep the wire from falling off of roller 48, and feed wire onto roller 48. The wire straightener 10 removes bend by first introducing a bend around roller 50, with the help of rollers 48 and 52. Before the wire has a chance to twist, roller 52 applies an opposite bending force, whose amount can be altered for different wire sizes by changing the relationship between the angle of the pulling force of a line that intersects the centers of roller 50 and 52. The line that intersects the center of rollers 50 and 52 is stationary, so the angle of pulling force A in relationship to the line is changed. To change the pulling force angle the anchor point is changed.

An important part of the invention is the specific geometry of the rollers 48, 50 and 52 in relation to the pivot hole 20. The three roller positions are arranged so that the center of their axle is approximately 40 mm apart, and the center of each of the three axles forms approximately a straight line. In one configuration of the device, the center of the axle of roller 50 is 3 cm from a line formed between the axle centers for rollers 48 and 52, in a direction to the left in FIGS. 3 and 4. For 14 gauge wire, the center of the pivot hole 20 is approximately 55 mm from the center of the roller axle of roller 48. A line formed from the center of roller 52 to roller 48 is approximately 25° from a line between the center of roller 48 and the center of a pivot hole for 14 gauge wire. Similarly, the line between the center holes of rollers 52 and 48 is approximately 37° for 12 gauge, 44° for 10 gauge, and 51° for 8 gauge.

The center of roller 48 is 60 mm from the center of the pivot hole for 12 gauge, 68 mm for 10 gauge, and 78 mm for 8 gauge.

Figure 6:
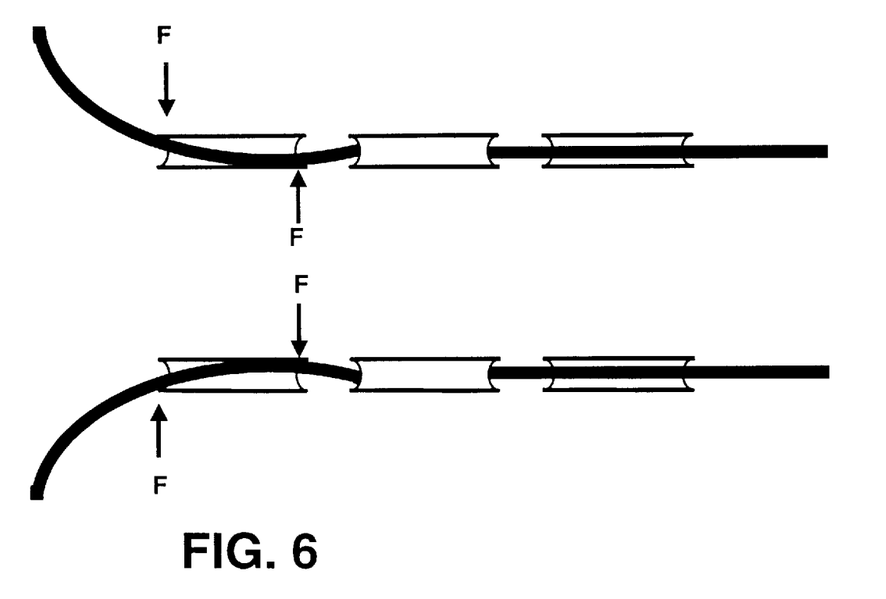
FIG. 6 is a side view of a wire passing through the rollers.

FIG. 6 shows how a set of rollers in one plane may operate to remove bends in wire which may be in 2 or more planes. The wire may be straightened on two planes due to force applied by the sides of the roller grove. As wire enters the roller 48 from the wire guides 34, 36, or 38, the roller 48 applies a force F at its edge to force the wire into a line parallel to the roller groove bottoms, which is a path of lesser resistance.

It has also been found that wire entering the roller 48 tends to rotate as it passes through the rollers 48, 50 and 52. This rotation may align the bend of the wire with the plane of the first roller, which is then canceled out by the reverse bend of the second roller 50. This mechanism could explain why rollers in one plane could cancel and remove bends and coiling memory in more than one plane.

While there is shown and described the present preferred embodiment of the invention, it is to be distinctly understood that this invention is not limited thereto but may be variously embodied to practice within the scope of the following claims.

From the foregoing description, it will be apparent that various changes may be made without departing from the spirit and scope of the invention as defined by the following claims.

I claim:

1. A wire straightener for removing bends and coiling memory from a wire, comprising:

a planar roller plate which provides a mounting base for a wire straightening means, and which includes more than one pivot point, which are configured to interfit with a pivot anchor, so that said planar roller plate is anchored to said pivot anchor, but is free to rotate around said pivot point;

a plurality of rollers mounted in one plane, each mounted on roller axles, forming said wire straightening means, which are mounted on said roller plate and through which said wire is passed;

wherein said roller plate rotates around a pivot point on said pivot anchor and self adjusts for wires of different size by changing an amount of wrap of said wire around at least one of said rollers, so that said wire is delivered from said wire straightener substantially straight and free of bend or coiling memory.

2. The wire straightener of claim 1 which straightens wire with bends in more than one plane, by applying bending forces from rollers which are mounted in one plane.

3. The wire straightener of claim 1 which further comprises three rollers on three roller axles, said roller axles mounted on said roller plate.

4. The wire straightener of claim 1 in which a wire can be put in or taken out of said wire straightener at a mid portion of said wire.

5. The wire straightener of claim 1 in which said rollers are wheels with grooved rims, said grooves having sides and a bottom.

6. The wire straightener of claim 1 which further comprises a wire guide for guiding said wire onto one of said rollers.

7. The wire straightener of claim 1 which further includes multiple pivot points, which are configured to provide correct alignment of wire and rollers and correct amount of wire wrap around a roller, for a particular size of wire.

8. The wire straightener of claim 7 in which said planar roller plate is mounted by one of said pivot points to a frame.

9. The wire straightener of claim 5 in which said grooves have curved and not V-notched bottoms.

10. The wire straightener of claim 1 which further comprises multiple rollers on each roller axle, so that more than one wire may be straightened simultaneously.

11. The wire straightener of claim 10 which further comprises multiple wire guides for guiding more than one wire onto said rollers for straightening.

12. A wire straightener for removing bends and coiling memory from one or more wires, comprising:

a planar roller plate which provides a mounting base for a wire straightening means which straightens wire by applying bending forces to said wire, and which includes more than one pivot point, which are configured to interfit with a pivot anchor, so that said planar roller plate is anchored to said pivot anchor, but is free to rotate around said pivot point in order to provide an adjusted alignment of a wire with said rollers for an adjusted amount of wire wrap around a roller, for a particular size of wire;;

three sets of rollers, each set containing three rollers, with rollers configured to provide multiple wire paths comprising one roller from each set of roller, each roller in each of said wire paths being in a plane, in which each roller is a wheel with a grooved rim, and each set of rollers is a plurality of rollers mounted on a roller axle, forming said wire straightening means, with each roller axle mounted on said roller plate and through which said one or more wires is passed, and where said three rollers are configured to apply bending forces to said wire, with each roller applying a bending force opposite to an adjacent roller;

means of anchoring said roller plate, so that said wire can be pulled through said wire straightener;

one or more wire guides for guiding said wire onto a roller;

wherein a wire with a bend in one or more planes can be put in or taken out of said wire straightener at a mid portion of said wire, and said roller plate rotates around a selected pivot point on said means of anchoring in order to self adjust for wires of different size by changing an amount of wrap of said wire around at least one of said rollers, so that said wire is delivered from said wire straightener substantially straight and free of bend or coiling memory.

* * * * *